United States Patent [19]

Newby et al.

[11] Patent Number: 4,973,458

[45] Date of Patent: Nov. 27, 1990

[54] FLUIDIZED BED SYSTEM FOR REMOVING PARTICULATE CONTAMINANTS FROM A GASEOUS STREAM

[75] Inventors: Richard A. Newby, Pittsburgh; David F. Ciliberti, deceased, late Murrysville, by Paula Ciliberti, executrix; Thomas E. Lippert, Murrysville, all of Pa.

[73] Assignee: Westinghouse Electric Corp., Pittsburgh, Pa.

[21] Appl. No.: 351,136

[22] Filed: May 9, 1989

[51] Int. Cl.$^5$ .................... C01B 17/00; B01D 53/06
[52] U.S. Cl. .................... 423/244; 55/73; 55/74; 55/77; 55/302; 55/390; 55/523; 422/144
[58] Field of Search .......... 55/73, 74, 77–79, 55/99, 181, 390, 474, 523, 302; 422/139, 144, 145, 169, 170; 423/244 R, 244 A

[56] References Cited

U.S. PATENT DOCUMENTS 2,548,875  4/1951  Degnen et al.
4,650,647  3/1987  Kito et al. .................... 422/169

Primary Examiner—Charles Hart

[57] ABSTRACT

An apparatus and method for removing particulate contaminants, and optionally gaseous contaminants, from a hot gaseous stream where a vessel is provided containing a fluidized bed zone and the gases are passed through the fluidized bed zone containing a fluidized bed of granular media prior to passage of a major portion of the gas through a plurality of first hollow, ceramic, barrier filter elements at least partially disposed in the fluidized bed, and a minor portion thereof through a plurality of second hollow, ceramic, barrier polishing filter elements removed from the fluidized granular media. The plurality of first filter elements are scoured by the granular media to remove collected deposits while fine particulates collected on the plurality of second filter elements are removed by back flushing of a gas therethrough.

16 Claims, 3 Drawing Sheets

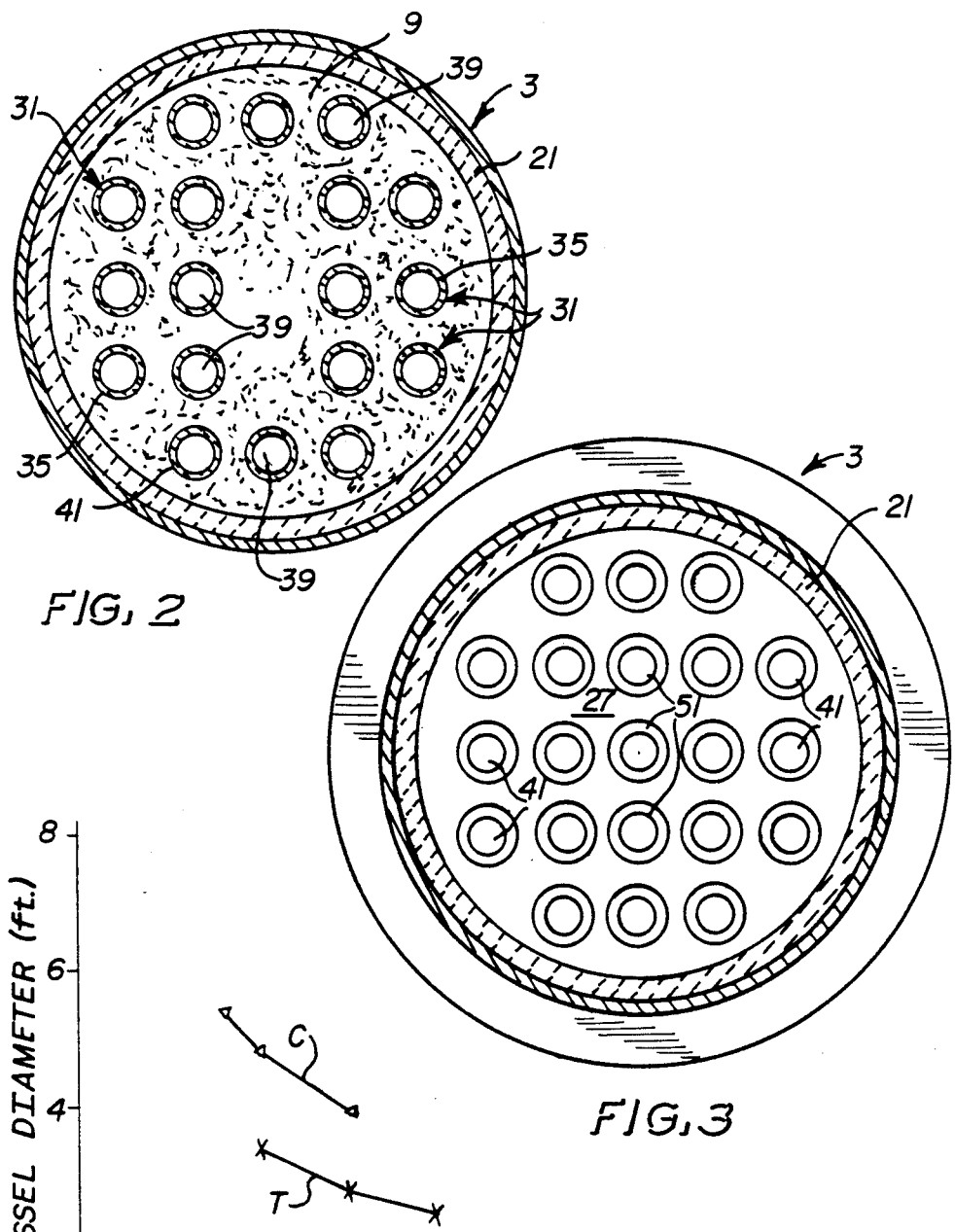

FLUIDIZED BED SYSTEM FOR REMOVING PARTICULATE CONTAMINANTS FROM A GASEOUS STREAM

CROSS REFERENCE TO RELATED APPLICATION

This application is related to application Ser. No. 351,497, filed on even date herewith, in the names of Thomas E. Lippert and David F. Ciliberti, entitled "Apparatus and Method for Removing Gaseous Contaminants and Particulate Contaminants from a Hot Gas Stream" (W.E. 54,854), which application is assigned to the assignee of the present invention.

FIELD OF THE INVENTION

The present invention relates to a fluidized bed system for removing particulate contaminants, and gaseous contaminants where present, from a high temperature gaseous stream, and to a method for removing such contaminants while maintaining an adequate flow of said gaseous stream.

BACKGROUND OF THE INVENTION

Fluidized-bed reactors generally consist of the following elements: an inlet plenum for the fluidizing gases; a distributor device for the fluidizing gases, such as an orifice plate, a bubble-cap plate, or horizontal orifice pipes; the fluidized bed region where a dense bed of particles mixes with bubbles of reactant gases, and where heterogenous catalytic reactions, heterogenous gas-solid reactions, or physical transformations of the solid or gases may occur (e.g., adsorption, drying or particle growth); and a freeboard region where particles splashed from the fluidized bed have an opportunity to decelerate and drop back into the fluidized bed region before they are entrained from the reactor with the exhaust gases. There may also be a low-efficiency particulate control device such as a cyclone that will remove the majority of particles from the exhaust gas and either dispose of the collected particles or recycle them to the fluidized bed region, and possibly a high-efficiency particulate control device such as a barrier filter that will protect downstream equipment from contamination or erosion due to entrained particles, or will protect the environment.

In most fluidized-bed reactor systems the volume of the system will be dominated by the freeboard region (having a volume of about 1 to 10 times the fluidized bed volume) and by the particulate control equipment. There is little incentive to attempt to minimize the volume of the fluidized bed itself since the cost of the reactor system will be set by the freeboard and particulate control equipment. In some cases the freeboard region may be the site of significant chemical conversion itself, but in most fluidized-bed reactor applications the freeboard region is simply a large volume that does not contribute to the chemical or physical transformations of interest. Likewise, the particulate control equipment will occupy a large volume that does not contribute to the key transformations. Thus, the problem that is evident is the waste of equipment volume and its resulting high cost.

High-efficiency particulate control devices of the barrier filter class generally form filter cakes at the boundary that must be removed by either mechanical or hydrodynamic forces. Typically, filters are periodically back-blown by a high-pressure stream of clean gas to break off the filter cake and reduce the pressure drop across the filter. The filter then operates in an unsteady, cyclic fashion of slowly increasing pressure drop as the filter cake thickness increases, followed by a sudden pressure drop reduction as the cake is removed. The cost and complexity associated with the cleaning of the filter is significant. This identified another problem area characteristic of these systems.

U.S. Pat. No. 2,548,875 to Degnen et al., dated Apr. 17, 1951, describes a method for contacting gases and solids. Gases are passed through a contact chamber containing a catalyst where porous filter elements are used to separate the catalyst particles from the gas. The filters are totally or largely submerged in the dense phase of catalyst in the fluidized bed of the contact chamber and impingement of circulating catalyst particles on the surface of the filter is said to keep the surface of the filters relatively free of adherent catalyst particles to prevent an undesired increase in pressure required to force the gas through the filter.

As described in said patent, a portion of the gas, containing catalyst, may be removed from the vessel and separately treated to remove solids so as to maintain a sufficiently high velocity of gas through the vessel, which gas may be passed to a cyclone separator to remove solids therefrom and then returned to the vessel with further incoming gas to the vessel.

An object of the present invention is to combine a fluidized bed region with a filtering system in a single vessel so as to eliminate or reduce the freeboard region above the fluidized bed, eliminate the need for intermediate solids separation equipment such as cyclones, and provide for continuous self-cleaning of the bulk of the filter units used in the separation of particulates from a hot gaseous stream.

SUMMARY OF THE INVENTION

A fluidized bed system for removing particulate contaminants from hot gases, with a fluidized bed of granular media used to clean the outer surface of ceramic filters, has a housing, a fluidized bed zone defined by the housing containing a fluidized bed of granular media and an inlet for gases to the fluidized bed zone.

A plurality of first hollow, ceramic, barrier filter elements are disposed in the fluidized bed zone with at least a portion thereof disposed in the housing in the fluidized bed of granular media, and a plurality of second hollow, ceramic, barrier polishing filter elements are disposed in the housing at a location removed from the fluidized bed of granular media. The hot gases containing particulate contaminants are introduced into the fluidized bed zone and a major portion of the gas passes through the first plurality of filter elements while a minor portion thereof passes through the second plurality of filter elements. Particulate contaminants are deposited on the outer surface of the first plurality of filter elements and removed therefrom by the scouring action of the granular media, with alternative assistance from blowback gas, while fine particulates are deposited on the outer surface of the second plurality of filter elements and removed therefrom by blowback gases. In some applications, the fine particulate contaminants will contain sticky constituents which will agglomerate with the granular media of the fluidized bed, thus removing these constituents from the gas and protecting the filter elements from deposits that would be difficult to remove. In some cases, an agglomerating agent may be injected into the fluidized bed to promote such agglomeration.

In one embodiment, the second plurality of filter elements are shorter than the first plurality of filter elements and thus maintained above the fluidized bed of granular media in the housing, while in another embodiment a weir separates the housing into first and second regions, with the fluidized bed and first plurality of filter elements in the first region and the second plurality of filter elements in the second region of the housing.

A method for removing fine particulates from a hot gaseous stream has a gas stream charged to a housing containing a fluidized bed of granular media in a fluidized bed zone, with a major portion of the gas passed through a first plurality of hollow, ceramic, barrier filter elements that are disposed in the fluidized bed such that deposits of particulates tending to collect on the surfaces of the filter elements are removed by the granular media. A minor portion of the gas, after the passage through the fluidized bed of granular media, is passed through a second plurality of hollow, ceramic barrier polishing filter elements also disposed in the housing, outside the fluidized bed zone, with fines collected on the surface of the second plurality of filters and removed, along with the particulates, from the housing.

BRIEF DESCRIPTION OF THE DRAWINGS

The invention will become more readily apparent from the following description of preferred embodiments thereof shown, by way of example only, in the accompanying drawings, wherein:

FIG. 2 is a view taken along lines II—II of FIG. 1;

FIG. 3 is a view taken along lines III—III of FIG. 1;

FIG. 4 is a graphical representation of the calculated vessel diameter as a function of filter velocity of the present apparatus for different types of hollow, ceramic, barrier filter elements;

DETAILED DESCRIPTION

Figure 1:
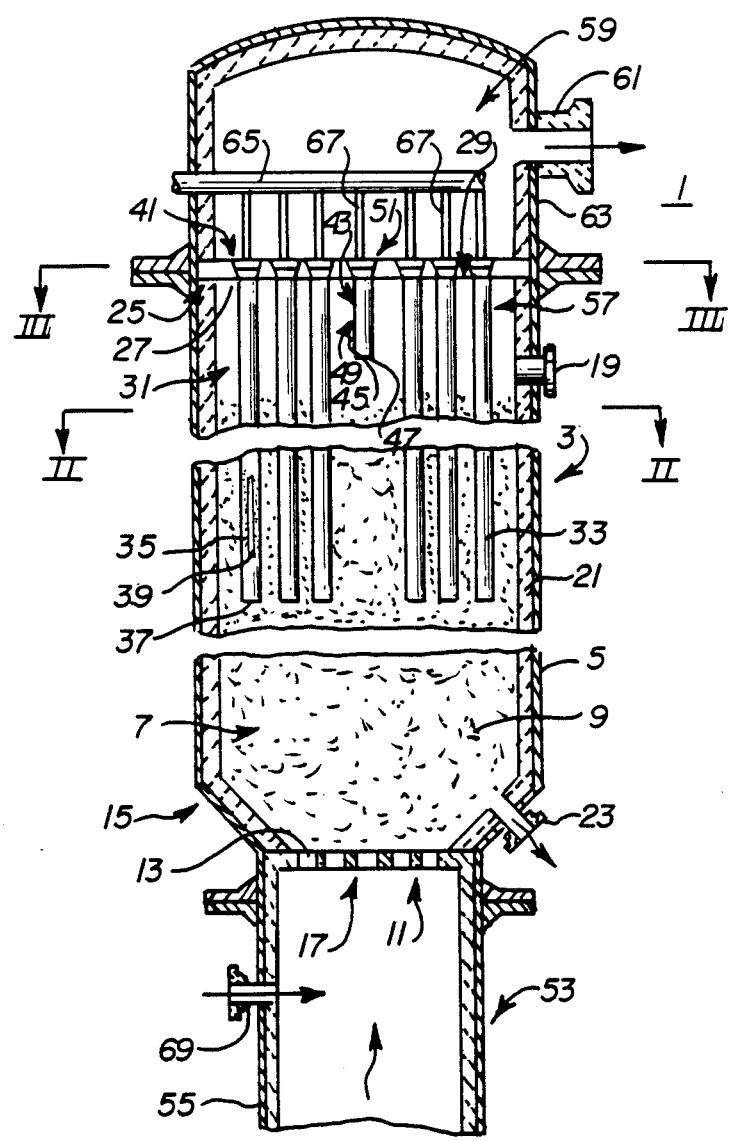
FIG. 1 is a schematic longitudinal section of an embodiment of the apparatus of the present invention.

An embodiment of the fluidized bed system 1 of the present invention is illustrated in FIG. 1, showing a housing 3, in the form of a vertically extending cylindrical housing 5. A fluidized bed zone 7 is provided in the housing 3, with a bed of granular media 9 provided therein, as well as means 11 for maintaining fluidization of the bed of granular media. The means 11 for fluidization of the bed of granular media is illustrated as a high temperature gas distributor or orifice plate 13 at the lower section 15 of housing 3, with gases entering through gas flow passages 17 from a source, such as a combustion unit (not shown). A means for adding fresh or uncontaminated granular media to the bed 9 is provided by an inlet 19 through the wall 21 of the housing, while an outlet 23 is provided to enable removal of spent or contaminated granular media from the bed 9.

A means 25, such as a cooled tubesheet 27 with openings 29 therein, is used to dispose a plurality of hollow filters in the fluidized bed zone 7. A plurality of first hollow, ceramic, barrier filter elements 31 are disposed by the tubesheet 27 in the fluidized bed zone 7, with at least a portion 33 of the filter elements 31 disposed in the fluidized granular media 9. The hollow, ceramic, barrier filter elements 31 each have a porous closed wall 35 and closed bottom 37, which define a hollow chamber 39 that communicates with the exterior of the fluidized bed zone 7, such as through open tops 41 of the filter elements which close off the openings 29 in the tubesheet 27. A plurality of second hollow, ceramic barrier filter elements 43, in the nature of polishing filters, are also disposed in the housing 3, which filter elements 43 also have a porous closed wall 45 and bottom 47, forming a hollow chamber 49 and open top 51 communicating with the exterior of the fluidized bed zone 7. The plurality of second filter elements 43, however, are arranged such that the same are removed from the fluidized bed of granular media 9.

A means 53 for introducing a gas stream containing particulate contaminants into the fluidized bed zone 7, such as a conduit 55, is arranged to direct such gas through the orifice plate 13. As illustrated in FIG. 1, the tubesheet 27 divides the vertically extending cylindrical housing into two sections, a lower section 57 containing the fluidized bed zone 7 and hollow, ceramic, barrier filter elements 31 and 43, and an upper section 59 into which the open tops 41, 51 of the filter elements communicate, and from which clean gases exit through an exhaust 61 through the outer wall 63 of the housing 5. The hot gases containing particulates are introduced through the orifice plate 13 and into the fluidized bed of granular media 9 in the fluidized bed zone 7, and the hot gases pass through the hollow, ceramic, barrier filter elements 31 and 43, exit through their open tops 41 and 51 respectively, and are discharged from the upper section 59 of the housing 5 through the exhaust 61. The particulates contained in the gas stream are collected on the walls 35 and 45 of the hollow, ceramic, barrier filter elements 31 and 43 respectively. The plurality of first hollow, ceramic, barrier filter elements 31 are scoured by the fluidized bed of granular media 9 resulting, in effect, in a continuous "self cleaning" of the filter elements 31. Provision may also be made for occasional pulse jet cleaning of the hollow, ceramic, filter elements 31, such as through injection of a gas from a source (not shown) through a manifold 65 and then through jet pipes 67 directed through the open tops 41 of the filter elements 31. Particles collected on the outer surface of the plurality of second hollow, ceramic, barrier polishing filter elements 43 are not contacted by the fluidized bed of granular media 9 and are cleaned by the pulse jets from pipes 67.

In those instances where gaseous contaminants are present in the hot gas stream, a sorbent material is injected through an injection port 69 into the conduit 55 and entrained in the hot gas stream, or the granular media of the fluidized bed may function as a sorbent.

High performance, compact, hollow, ceramic barrier filters are used on the barrier filter elements 31 and 43. Several high-temperature hollow, ceramic, barrier filter elements are currently available or under development for pressurized fluid bed combustion and coal gasification applications. Such filters include hollow ceramic candle filter units, such as sintered ceramic (SiC) candles or $Si_3N_4$ tubes. These filter units have demonstrated collection efficiencies greater than 99.9% and the ability to be cleaned on-line by simple pulse jet methods. The candle filter units represent rigid, barrier filter units. For some of the barrier filter types being considered in this invention, representative size and filter area parameters are:

(C) SiC candle filters, having a length of 1.5 m, an outside diameter of 5.97 cm and wall thickness of 40 mm, with a center to center spacing of 0.362 ft. and filter area per module of 3 ft$^2$ would have a filter capacity of 30 to 60 acfm; and (T) Si$_3$N$_4$ tubes having a length of 3 m, an outside diameter of 5.97 cm and wall thickness of 40 mm, with a center to center spacing of 0362 ft. and a filter area per module of 6 ft$^2$ would have a filter capacity of 60 to 120 acfm.

Referring to FIG. 3, there is graphically illustrated a plot of the vessel diameter as a function of filter face velocity for a pressurized combustor application having a total gas flow of 30 lbs/sec. at 10 atmospheres pressure. The curves corresponding to the hollow filter types are shown: C=ceramic candle, T=Si$_3$N$_4$ tubes, with the curves corresponding to each filter type extended only over a face velocity range considered achievable for that filter in the present apparatus and method. For the candle filter (c), a 15 ft/min. velocity has been assumed as an upper limit based on operating pressure drop in current such filter elements. Development of a "graded" thin wall candle of Si$_3$N$_4$—tube that would exhibit lower pressure drop characterization would permit an extension of the assumed velocity limit. In addition, the development of a longer candle section would significantly enhance the ability to achieve higher filter surface area packing arrangements. The results of the preliminary sizing calculations for the single combustor/turbine configuration shown in FIG. 3 show that the proposed low emission gas cleaning can be contained in relatively small diameter vessels.

The filter elements chosen must be compatible with the fluidized bed reactor environment. The filter element length and permeability must be such that the gas withdrawal rate through the filter elements will be limited to maintain fluidization over the entire bed height. A permeability profile may be used in the filter elements to control the gas withdrawal flow, or a set of filter elements of different lengths may be placed in the bed to provide a profile of filter surface area.

Figures 5, 6:
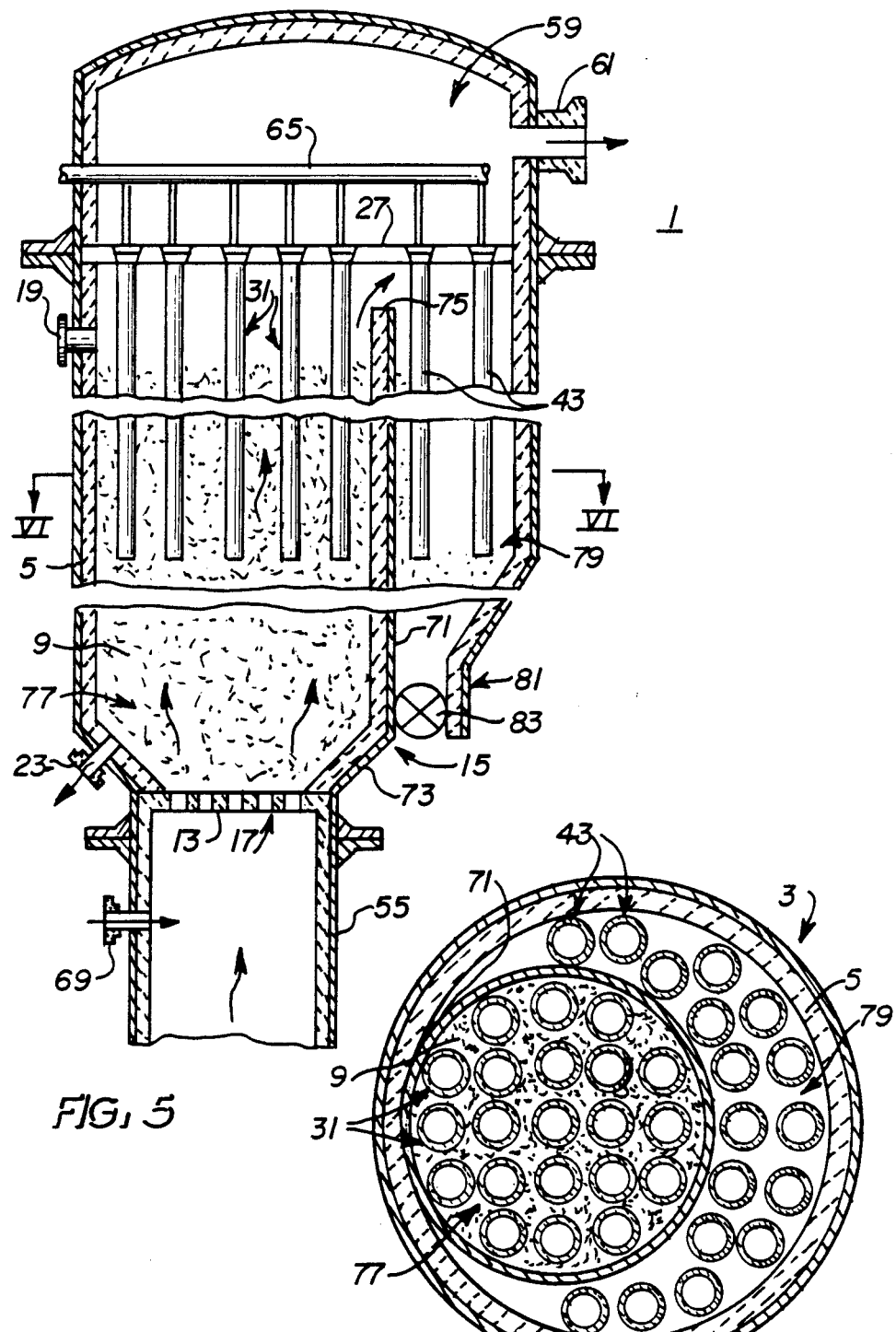
FIG. 5 is a schematic longitudinal section of another embodiment of the apparatus of the present invention.
FIG. 6 is a view taken along the lines VI—VI of FIG. 5.

Another embodiment of the present apparatus 1 is illustrated in FIGS. 5 and 6 where a weir is provided to separate a fluidized bed zone from a polishing zone in the vertically extending cylindrical housing 5. A weir 71 extends upwardly from the lower section 15 of the housing, from the bottom wall 73, and has a terminus 75 which is spaced from the divider or tube sheet 27. The weir 71 segregates the housing 3, below the tubesheet 27, into a first region 77 and a second region 79. The fluidized bed of granular material 9 and plurality of first filter elements 31 are disposed in the first region 77, while the plurality of second filter elements 43 are disposed in the second region 79. Fines are collected, after dislodging from the filters 43 in the lower region 81 of second section 79 and removed therefrom through valve 83.

A cold model of a self-cleaning barrier filter was set up and operated to study the nature of the fluidization and the ability of the filter to operate with high dust loadings and remain clean. The unit consists of a Plexiglas tube about 6 in. diameter, containing a commercial, star-shaped, sintered metal filter element inserted vertically into a bed of 1000 μm dolomite. When fluidized at a velocity of about 1.5 ft/sec., with a high in-bed dust loading, the fluidization quality was acceptable even though most of the gas withdrawn from within the bed. Gas bubble and resulting particle motion over the filter surface was confirmed. The filter surface immersed in the bed remained very clean by the scouring action of the particles, while the filter surface in the splash zone of the bed was also partially cleaned.

In the present method, fine particulates are removed from a hot gas stream by charging the gas stream, at a temperature of between 300° to 2500° F., containing the contaminants into a fluidized bed of granular media 9 contained in a fluidized bed zone 7 in housing 3, the granular media trap having a particle size of between about 200 to 2000 m. A major portion of the hot gas is passed through the plurality of first hollow, ceramic, barrier filter elements 31, disposed in the housing 3, which filter elements have a porous closed wall 35 and bottom 37 disposed in the fluidized bed 9 and an open top 41 that communicates externally of the fluidized bed zone 7. Particulate contaminants are separated from the gas stream and tend to collect on the walls 37 of the filter elements 31 while the gas passes to the hollow chamber 49 and from the open top 41 thereof. With the plurality of first hollow, ceramic, barrier filter elements 31 disposed in the fluidized bed of granular media 9, deposits of particulate contaminants collecting on the wall 35 of the filter elements 31 are removed therefrom by the scouring action of the granular media. At high temperature, fine particulate contaminants, such as coal ash particles may be "sticky" and will agglomerate with the granular media of the bed. An agglomerating agent, such as a clay material may be added to the fluidized bed to promote such agglomeration. A minor portion of the gas, after passage through the fluidized bed of granular media 9, is then passed through a plurality of second hollow, ceramic, barrier polishing filter elements 43 disposed in the housing 3, said filter elements 43 having a porous closed wall 45 and bottom 47 and an open top 51 that communicates externally of the fluidized bed zone 7. The plurality of second hollow, ceramic, barrier polishing filter elements 43 are disposed outside the fluidized bed of granular media 9 and deposits of fine material escaping through and from the fluidized bed of granular media 9 are separated from the gas stream with the clean gas passing through the hollow chamber 49 and out of the open tops 51. The fine material is thus separated from the gas stream and collected on the walls 45 of the plurality of second hollow, ceramic, barrier polishing filter elements 43 and discharged therefrom by discharge means, such as jet pipes 67. The separated particulates and fines are then periodically removed from the housing 3.

Where gaseous contaminants are also to be removed from the hot gas stream, a sorbent for the gaseous contaminant is injected into the gas stream, such as through injection port 69, prior to charging of the gas stream into the fluidized bed of granular media 9.

When removing sulfur dioxide or hydrogen sulfide from a hot gaseous stream, calcium-based sulfur sorbents, limestones, dolomites, quicklimes, or hydrated limes, can be used for temperatures up to about 2200° F. Fine particles (less than 25 micrometers in diameter) are used to achieve high levels of sulfur control within the space constraints. The fine sorbent particles are retained through the use of a granular bed material. This granular material is selected to minimize pressure drop, achieve good solids handling, achieve particle filtering, and prevent bulk agglomeration. The granular media may also function as a sulfur sorbent, such as where limestone or dolomite are used.

At temperatures above 2200° F., an alternative sulfur sorbent would have to be used. Barium oxide or strontium oxide, as simple oxides or in various mixed oxide forms, perform well at temperatures up to 2500° F. Depending on the economics of the application, regeneration of these sulfur sorbents may be required. They could be used in their pure forms or could be impregnated into a support structure such as porous alumina particles.

Alkali removal could be accomplished by the injection of very fine particles of emathlite, bauxite or other clays, less than 25 micrometers in diameter. The effective use of the sorbent is promoted by the accumulation of the sorbent in the fluid bed granular media and on the filter surfaces.

What is claimed is:

1. A fluidized bed system for removing particulate contaminants from a hot gas stream comprising:
   a housing;
   a fluidized bed zone defined by said housing;
   a bed of granular media in said fluidized bed zone;
   means for maintaining fluidization of said granular media in said fluidized bed zone, including means for adding uncontaminated granular media to said bed and removing contaminated media from said bed;
   means for disposing a plurality of first hollow, ceramic, barrier filter elements in said fluidized bed zone, said first hollow filter elements each having a porous closed wall and bottom, and an open top communicating with the exterior of said fluidized bed zone, with at least a portion of said first hollow filter elements disposed within said fluidized granular media; and a plurality of second hollow, ceramic, barrier polishing filter elements in said housing, said second hollow filter elements having a porous closed wall and bottom, and an open top communicating with the exterior of said fluidized bed zone, said second hollow filter elements removed from said fluidized granular media; and
   means for introducing a gas stream containing particulate contaminants into said fluidized bed zone such that said gas passes through the walls of said hollow filter elements, and is discharged through said open tops, with said particulate contaminants being separated therefrom.

2. A fluidized bed system for removing particulate contaminants from a hot gas stream as defined in claim 1 wherein said housing has a divider therein separating the same into said fluidized bed zone and a clean gas discharge zone, and said plurality of first and second hollow filter elements extend from said divider into said fluidized bed zone, communicating with said clean gas discharge zone, and means are provided on said housing for discharging said clean gas from said clean gas discharge zone.

3. A fluidized bed system for removing particulate contaminants from a hot gas stream as defined in claim 2 wherein said means for maintaining fluidization of said granular media in said fluidized bed zone is an orifice plate at a lower section of said housing and said means for introducing the gaseous stream into said fluidized bed zone is a conduit arranged to direct such gas through said orifice plate.

4. A fluidized bed system for removing particulate contaminants from a hot gas stream as defined in claim 3 including an inlet on said vessel for adding fresh granular media to said fluidized bed and an outlet on said vessel for removal of spent granular media from said fluidized bed.

5. A fluidized bed system for removing particulate contaminants from a hot gas stream as defined in claim 1 wherein said plurality of first, hollow, ceramic, barrier filter elements and said plurality of second, hollow, ceramic, barrier, polishing filter elements comprise hollow ceramic candle filter units.

6. A fluidized bed system for removing particulate contaminants from a hot gas stream as defined in claim 5 wherein said plurality of second filter elements are of a shorter length than said plurality of first filter elements.

7. A fluidized bed system for removing particulate contaminants from a hot gas stream as defined in claim 2 wherein said housing is a vertically extending cylindrical housing, a weir extends upwardly in said housing and has a terminus spaced from said divider, segregating said housing into first and second regions; and said fluidized bed and plurality of first filter elements are disposed in said first region and said plurality of second filter elements are disposed in said second region.

8. A method of removing fine particulate contaminants from a hot gaseous stream comprising:
   charging said gas stream containing said contaminants into a housing containing a fluidized bed of granular media contained in a fluidized bed zone;
   passing a major portion of said gas through a first plurality of hollow, ceramic, barrier filter elements, disposed in said housing, having a porous closed wall and bottom disposed in said fluidized bed and an open top communicating externally of said fluidized bed zone, such that particulate contaminants are separated from said gas stream and are collected on the wall of said hollow filter elements while gas passes to the hollow thereof and from said open top;
   said plurality of first hollow, ceramic, barrier filter elements being disposed in said fluidized bed of granular media such that deposits of particulate contaminants collecting on the wall of said filter elements are removed therefrom by said granular media;
   passing a minor portion of said gas, after passage through said fluidized bed of granular media, through a second plurality of hollow, ceramic, barrier polishing filter elements, disposed in said housing, having a porous closed wall and bottom and an open top communicating externally of said housing, disposed outside said fluidized bed of granular media, such that deposits of fine material escaping from said fluidized bed of granular media are separated from said gas stream and are collected on the walls of said second filter elements; and
   removing the separated particulate contaminants and fine material from said housing.

9. A method of removing particulate contaminants from a hot gaseous stream as defined in claim 8 wherein said gas is at a temperature of between about 300° to 2500° F.

10. A method of removing particulate contaminants from a hot gaseous stream as defined in claim 9 wherein said gaseous stream contains gaseous contaminants and the granular media forming said fluidized bed contains a sorbent material for said gaseous contaminants.

11. A method of removing particulate contaminants from a hot gaseous stream as defined in claim 10 wherein said sorbent material for said gaseous contaminants is injected into said gaseous stream prior to charging thereof into said fluidized bed of granular media.

12. A method of removing particulate contaminants from a hot gaseous stream as defined in claim 11 wherein said gaseous contaminant is selected from the group consisting of sulfur dioxide and hydrogen sulfide, said sorbent is selected from the group comprising limestone, dolomite, quicklime, barium oxide and strontium oxide.

13. A method of removing particulate contaminants from a hot gaseous stream as defined in claim 10 wherein said sorbent material for said gaseous contaminants comprises at least a portion of the granular media injected as said fluidized bed granular media.

14. A method of removing particulate contaminants from a hot gaseous stream as defined in claim 13 wherein said gaseous contaminant is selected from the group consisting of sulfur dioxide and hydrogen sulfide, and said sorbent is selected from the group comprising limestone and dolomite.

15. A method of removing particulate contaminants from a hot gaseous stream as defined in claim 9 wherein said contaminants contain sticky constituents, which sticky constituents are agglomerated on the granular media of said fluidized bed.

16. A method of removing particulate contaminants from a hot gaseous stream as defined in claim 15 wherein an agglomerating agent is added to said granular media of said fluidized bed to promote agglomeration of said particulate contaminants within said fluidized bed.

* * * * *